Jan. 5, 1954     C. E. AHLBORN     2,664,814
PULP PRESS
Filed Feb. 21, 1948     2 Sheets-Sheet 1
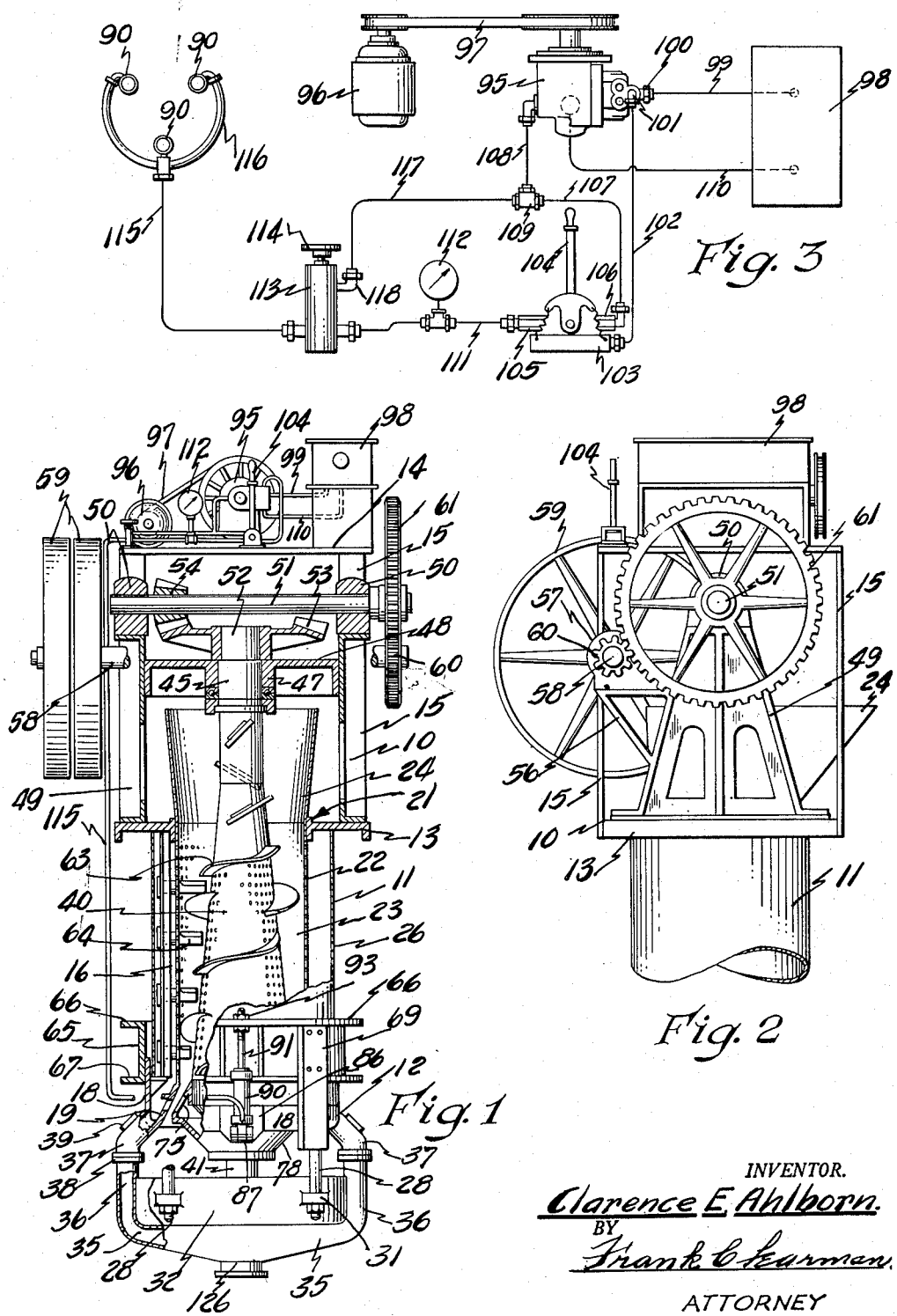
INVENTOR.
Clarence E. Ahlborn
BY Frank C. Fearman
ATTORNEY Jan. 5, 1954  C. E. AHLBORN  2,664,814
PULP PRESS Filed Feb. 21, 1948  2 Sheets-Sheet 2

INVENTOR.
Clarence E Ahlborn.
BY
Frank C Learman
ATTORNEY

Patented Jan. 5, 1954

2,664,814

UNITED STATES PATENT OFFICE 2,664,814

PULP PRESS

Clarence E. Ahlborn, Saginaw, Mich., assignor to Jackson & Church Company, Saginaw, Mich.

Application February 21, 1948, Serial No. 10,049

11 Claims. (Cl. 100—117)

The present invention relates to high pressure extrusion presses and in particular, to a continuous multi-stage press for extracting and expressing liquids from solids.

One object of the invention is to provide a continuous high pressure extrusion press having a shell and a cone-shaped extrusion screw arranged to form an extrusion chamber which is progressively contracted toward the discharge end of the press, and to provide means for regulating the discharge opening or choke without necessitating stopping of the press or cessation of the extrusion operation.

Another object is to provide automatic hydraulically actuated discharge or choke control whereby the choke is readily adjusted or varied in size to produce any desired restriction of the pulp outlet for the particular material being pressed.

Another object is to provide a continuous press of the above type which can be used for extracting juices or oils from any desired solid material, and which has complete choke adjustment with the back pressure in the press by the material being pressed, consequently, the choke control may be made responsive to variations in the load and will operate so as to maintain the load substantially constant.

Another object is to provide a continuous extrusion press in which the inner and outer extrusion chamber walls are perforated so that the liquids or juices expressed from the pulp material in the extrusion chamber will pass both inwardly and outwardly from opposite sides of the pulp material.

Another object is to provide a continuous high pressure extrusion press in which the discharge end of the extrusion chamber is restricted by inner and outer cone members having surfaces generated about axes of different lengths such that the area between the cone members will progressively contract from the discharge end of the extrusion chamber to the outlet orifice or aperture of the press.

Another object is to provide a continuous high pressure extrusion press which will not become jammed due to excessive caking of the pulp adjacent the discharge orifice.

Another object is to provide a continuous extrusion press in which the surfaces of the cone members at the discharge end of the extrusion chamber are screened to further enhance the extraction of juices and oils and provide a second extrusion or extraction stage.

Another object is to provide a continuous extrusion press which will accommodate materials having a wide variation of liquid content without affecting the operation of the press.

Another object is to provide a continuous extrusion press with means for collecting and discharging the thin pulp cake as it leaves the discharge end of the press, thereby eliminating clogging of the press and the resultant interruption of press operations.

Another object is to design a press which can be economically manufactured and assembled, which is efficient in operation and which requires but very little maintenance and supervision.

Another object is to provide a continuous extrusion press with a gravity biased control cone adapted to be moved upwardly by pressure fluid to control the choke discharge opening of the press.

Another object is to provide a movable choke control cone which is gravity biased and supported by a series of hydraulic cylinders circumferentially spaced equal angular distances so that the control cone will not bind and will be solely supported by the fluid in the cylinders.

Other objects and advantages of the invention will become apparent during the course of the following description of the accompanying drawings wherein:

Figure 1 is a front elevational view of the continuous extrusion press, parts being broken away to illustrate the construction.

Figure 2 is a fragmentary side elevational view thereof illustrating the drive gearing for the tapered feed shaft.

Figure 3 is a diagrammatic plan view showing the hydraulic system for the choke control means.

Figure 5:
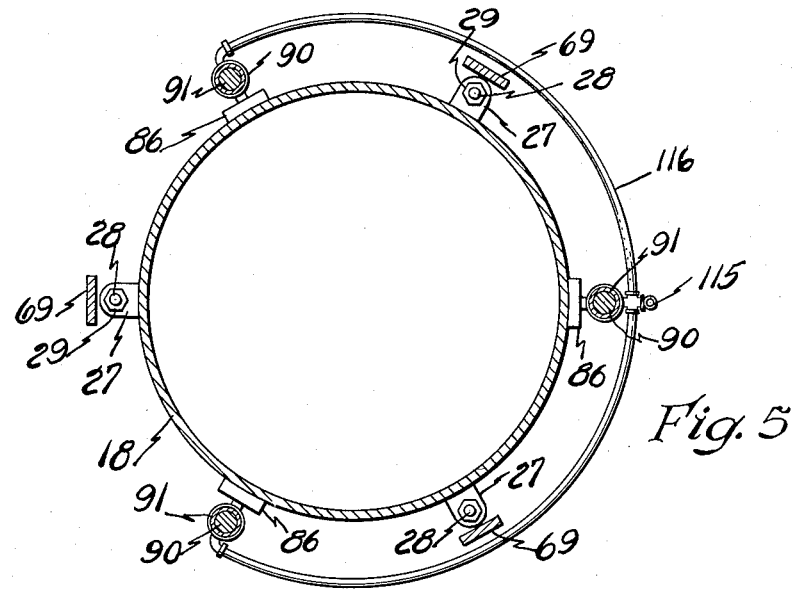
Figure 5 is a horizontal cross sectional view taken on line 5—5 of Figure 4 looking in the direction of the arrows to illustrate the circumferential spacing of the hydraulic control cylinders.

In the drawings, referring more in detail, there is shown a continuous extrusion press which is adapted for industrial installations and includes an upper frame structure generally designated 10, a central extrusion chamber section generally designated 11 and a lower extrusion and choke or discharge end generally designated 12.

The upper frame structure 10 is capable of being supported on the beams of an extrusion plant building with the lower discharge or choke end 12 supported on the floor or other support. The upper frame structure includes a frame plate 13 spaced from and supporting an upper frame plate 14 by suitable uprights 15 located at the corners of the frame plates 13 and 14. Depending from and secured to the underside of the frame plate 13 is a series of vertical frame bars 16, the lower ends of which are secured to inwardly extending brackets 17 formed integral with an annular casting or member 18 adjacent the discharge or choke end 12 of the press. The member 18 is provided with an inwardly and upwardly inclined annular portion 19 having a series of circumferentially spaced apertures 20.

Supported in an opening 21 in the frame plate 13 is a press cage 22 of cylindrical form and said cage or shell 22 forms the outer wall of an extrusion chamber 23. The cylindrical cage 22 is perforated to facilitate the passage of liquids and has its upper end projecting through the opening 21 in the frame plate 13, and formed to provide a feed trough or hopper 24. The lower end of the cylindrical press cage or shell 22 is flared outwardly as at 25 and extends along the upper portion of the inclined wall 19 of the member 18 so as to cover the apertures 20 and provide a conical surface to further enhance the expressing of the pulp material. The conical surface is generated on a cone axis from a vertex point adjacent the upper end of the extrusion chamber.

Surrounding the cylindrical perforated cage 22 and concentrically spaced therefrom is a cylindrical casing 26 which has its upper end edge in abutting relation with the frame plate 13, and its lower end edge likewise in abutting relation with the inwardly extending integral projections 17. Suitable brackets (not shown) are provided for securing the cylindrical casing 26 to the frame plate 13, and similarly, brackets may be provided for affixing the lower end edge of the cylindrical casing 26 to the inwardly extending projections 17.

Formed integral with the annular member 18 and circumferentially spaced therearound is a series of lugs 27 (Figures 4 and 5) to which is attached the reduced upper ends of a corresponding number of guide rods 28, which are held in place by retaining nuts 29. The lower ends of the guide rods 28 are similarly reduced as at 30, and extend through suitable openings in circumferentially spaced lugs 31 which are formed integral with a circular receptacle shaped casting or member 32. The lower ends of the guide rods are held in place by nuts 33. Thus, the annular member 18 and the receptacle-shaped member 32 are rigidly secured together in spaced apart relation. If desired, the circular receptacle-shaped member 32 can be supported on the floor of a building or suspended thereabove.

The receptacle-shaped member 32 is provided with an annular upstanding wall 33a to divide the receptacle-shaped member into concentric annular collection chambers, and also formed integral with and centrally of the receptacle-shaped member is an annular wall 34 which forms a bearing for the lower end of the tapered or conical feed screw which will be presently described.

Formed integral with the lower portion of the receptacle-shaped member 32 is a pair of radially extending conduits 35 having upwardly extending portions 36 which are integrated with the peripheral wall of the receptacle shaped member 32. The upper ends of the conduit extensions 36 are flanged and are adapted to be bolted as at 38 to the flanged lower ends of diametrically arranged discharge conduits 37 which are formed integral with the member 18. The discharge conduits 37 project downwardly and are provided with suitable clean-out openings which are closed by cover plates 39.

Rotatably mounted in the extrusion chamber 23 is a tapered or conical hollow shaft 40 which is perforated to permit liquids of extraction to pass freely therethrough to the center or interior of said hollow shaft. The lower end of the hollow shaft 40 is reduced as at 41 and terminates at its extreme lower end in a trunnion 42 which is journaled in the bearing 34. Also formed adjacent the lower end of the tapered or conical shaft 40 above the reduced portion 41 is a cylindrical smooth bearing surface 43. The reduced shaft portion 41 as well as the bearing portion 42 are hollow to permit the discharge of liquids to the central portion of the radially extending conduits 35 through a central opening 44 in the bottom wall of the receptacle-shaped member 32.

The upper end of the hollow tapered or conical shaft 40 is provided with a cylindrical bearing portion 45, and said bearing portion is journaled in a bearing collar 47 on a cross bar 48 supported at its ends by a pair of bearing bracket frames 49 arranged one at each side of the frame plate 13. The bearing frame brackets 49 are secured to the frame plate 13 by bolts or the like (not shown) and similarly, the cross bar 48 can be secured to the bearing bracket frames 49 by bolts or other fastening means.

Mounted on the upper end of each of the bearing supports or bracket frames 49 is a bearing 50 for rotatably supporting a shaft 51 extending above the upper end of the cylindrical bearing portion 45 of the tapered hollow shaft 40.

The extreme upper end of the tapered hollow shaft 40 is reduced as at 52, and is provided with a bevel gear 53 which is adapted to be drivingly engaged by a bevel gear 54 keyed or otherwise secured on the shaft 51 adjacent one end thereof.

Bearing bracket extensions 56 (Figure 2) are formed integral with the bearing bracket frames 49 and are provided with bearing journals 57 for supporting a drive shaft 58. One end of the drive shaft has keyed thereto the hubs of a pair of drive pulleys 59, while the other end has keyed thereto a pinion gear 60 which is in driving mesh with a pinion gear 61 of increased diameter likewise keyed to the shaft 51. Thus, it will be seen that rotation imparted to the shaft 58 will rotate the hollow tapered feed shaft 40 at a reduced speed with a correspondingly increased power.

The rotary hollow shaft 40 is provided with a plurality of spiral flights 63 for feeding pulp material downwardly in the progressively decreasing area of the extrusion chamber 23. Projecting into the extrusion chamber 23 is a series of resistors 64 which are disposed between sets of flights 63 to engage said material and prevent its rotation during rotation of the hollow conical shaft 40. The resistors 64 are supported on one or more of the vertical frame bars 16 by being anchored thereto.

Slidably mounted on the outer peripheral wall of the annular casting 18 is a band 65 which is flanged at its upper and lower edges as at 66 and 67, and mounted between the flanges at circumferentially spaced apart angular distances equal to the spacing of the lugs 27 on the member 18 is a plurality of blocks 68 which are welded to the opposed surfaces of the flanges 66 and 67, and also to the movable band or ring 65. The blocks 68 extend in a radial direction and have secured to their outer ends depending plates 69 held in place by machine screws 70 or the like.

Figure 4:
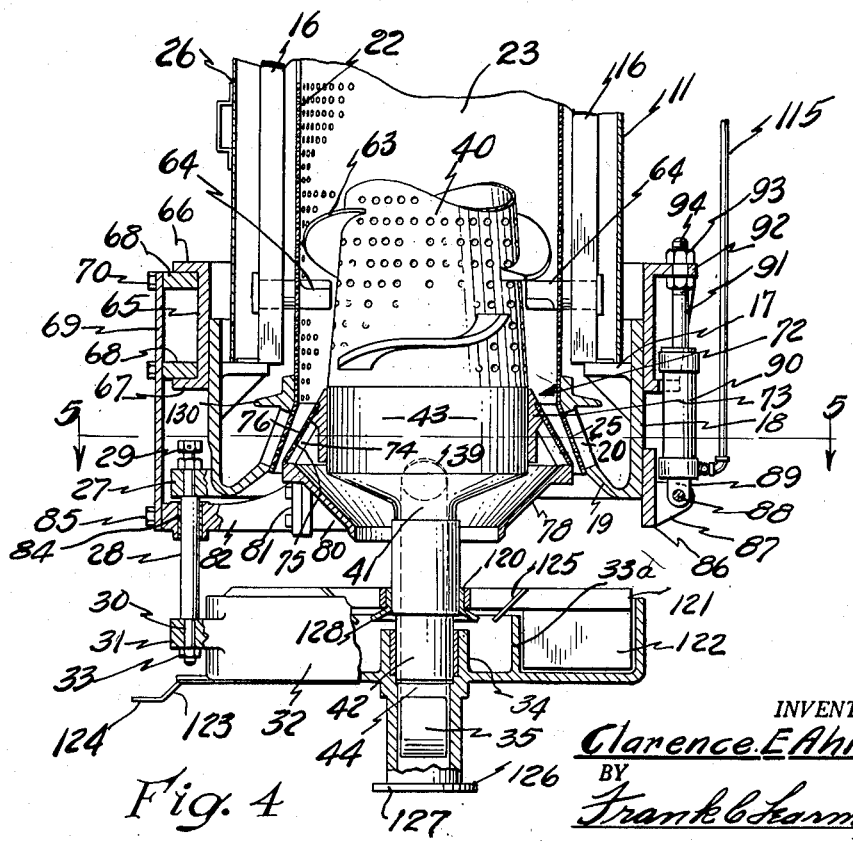
Figure 4 is an enlarged fragmentary vertical sectional view showing the discharge end of the extrusion press.

The lower ends of the depending plates 69 are adapted to movably support the central control choke cone generally designated 72 (Figure 4). The choke cone is comprised of a casting or member having a bearing sleeve portion 73 which is slidably mounted on the cylindrical portion 43 of the rotary hollow shaft 40, and formed integral with the sleeve 73 adjacent the upper edge thereof is an outwardly and downwardly flared wall 74 having a series of circumferentially spaced openings 75 covered by screening or perforated metal 76. The cone surface of the outwardly and downwardly flared wall 74 is generated on an axis with its vertex located on a point along the axis of the hollow shaft 40 adjacent the lower end of the extrusion chamber. Thus, the angularity of the tapered cone wall 74 is less acute than the angularity of the upwardly inclined wall 25, and two walls are adapted to cooperate to form a restricted throat or choke passage of gradually decreasing area from the upper portion of said walls to the lower portion thereof.

Also formed integral with the member 73 and downwardly inclined wall 74 is an inwardly and downwardly flared annular wall 78, the lower end of which terminates in spaced relation from the shaft 41 to allow extruded juices and oils to pass inwardly to the central portion of the receptacle-shaped member 32 and be collected within the central chamber formed by the upstanding wall 33a. Suitable openings may be provided in the bottom wall of the member 32 to allow the juices or liquids to pass into the conduit 35.

Extending radially from and formed integral with the downwardly and inwardly inclined wall 78 is a series of circumferentially spaced projections 80 to which is bolted as at 81 radially extending arms 82. The end portions of the arms 82 are provided with suitable openings having bearings 84, for receiving the guide rods 28 upon which the entire discharge choke member 72 is slidably mounted for vertical movement to and from the cooperating discharge choke cone 19. The lower ends of the circumferentially spaced depending plates 69 are affixed to the free ends of the arms 82 by means of machine screws or the like as at 85 so that vertical sliding movement of the ring or band 65 will likewise cause vertical to and fro movement of the discharge choke assembly including the parts 73, 78, arms 82 and depending plates 69.

Secured to the annular member 18 is a series of circumferentially spaced depending bracket plates 86, each of which is provided with spaced apart lugs or ears 86, between which is pivotally connected by means of pivot pins 88 the lug or arm 89 of a hydraulic or pneumatic cylinder 90.

The lower flange 67 of the ring 65 is cut away to accommodate the cylinder 90, and said cylinder is provided with a reciprocable piston (not shown) to which is attached a piston rod 91. The extreme upper end of each piston rod is threaded and is adapted to pass through circumferentially spaced openings 92 in the upper flange 66 of the slidable band or ring 65. Retaining nuts 93 are threaded on the correspondingly threaded ends 94 of the piston rods 91 to securely anchor said rod to the slidable ring or band 65.

Hence, when pressure fluid is admitted to the lower end of the cylinders 90 (the pressure being equal in each cylinder), the slidable ring or band 65 will be moved upwardly on the outer periphery of the member 18 and similarly, the discharge choke member 72 will be moved on the cylindrical surface 43 of the hollow shaft 40 in a corresponding direction so that the cooperating screened wall surfaces 19 and 74 will be moved toward one another and progressively restrict the choke discharge orifice. When the pressure is released, the slidable ring or band 65 and the discharge choke member 72 will move downwardly by gravity and the pressure fluid in the cylinders will be forced therefrom.

In order to supply the hydraulic cylinders 90 with pressure fluid, a pump 95 is mounted on the upper frame plate 14 of the press frame structure 10, and also mounted on said plate is an electric motor 96 which is drivingly connected to the pump by means of a transmission belt 97 (Figures 1 and 3). Liquid, such as oil, is supplied to the pump 95 from a reservoir tank 98 through a pipe line 99 which is connected to the intake of the pump as at 100. The outlet or discharge side of the pump is provided with a fitting 101 to which is connected a feed pipe 102. A control valve 103 having a manual control lever 104 is interposed in the pipe line 102, and said valve is provided with a pair of outlets 105 and 106. The outlet 106 is connected to the pump 95 by pipe lines 107 and 108 by means of a fitting 109 having opposed check valves arranged to permit fluid flow through the pipe lines 107 and 108 and back to the pump 95 when the manual control valve 103 is in a position to open the outlet 106. A pipe 110 has one end connected to the pump, and the opposite end connected to the reservoir 98 for returning excess oil or liquid returned by way of the pipe line 108.

Connected to the outlet 105 is a pipe line 111 in which is interposed a pressure gauge 112, and said line 111 is connected to a selector valve 113 having a manual control 114. The outlet side of the selector valve is fitted with a pipe line 115 for supplying pressure fluid to the cylinders 90 which are connected together by an arcuate manifold 116, and to which said pipe line 115 is in communication.

A relief line 117 is connected to the selector valve 113 as at 118, and said pipe line has its other end connected to the fitting 109 such as to permit free unrestricted fluid flow through the lines 117 and 108, but preventing fluid flow in an opposite direction through the fitting 109.

The manifold is provided with circumferentially spaced fittings which connect the manifold with the lower ends of the cylinders 90. Thus, pressure fluid can be supplied to the cylinders 90 to move the pistons therein upwardly and thereby raise the cone-shaped member 72 toward the cooperating cone surface 25. When the manual control handle 104 is moved to a position to connect the pipe lines 102 and 111, pressure fluid will move the pistons in the cylinders 90 equal distances to raise the ring or band 65, and likewise the cone-shaped member 72. However, when the manual control is shifted to close the outlet 105, the outlet 106 is opened to permit the pressure fluid to circulate through the pump 95. If after the pistons have been adjusted and it is desired to lower the cone-shaped member 72, for any reason, the valve 103 is shifted to permit the circulation of the pressure fluid through the pump, and the selector valve 113 is opened to permit the weight of the cone-shaped member and its associated parts to force the entrapped fluid in the cylinders out through the pipe line 115, and thence through the selector valve 113 to the pump by the return line 117. The selector valve is of a conventional three-way type to permit the inlet and outlet to be in communication in one valve position, to connect the line 115 with the line 117 in another position and to close all ports in the third position.

Thus, it will be seen that the selector valve can be positioned such that pressure fluid will be supplied to the cylinders 90 to position the cone-shaped member 72 in a predetermined position, and that after the same has been adjusted, the selector valve is operated by the control handle 114 to close the line 115 so that the cone-shaped member will remain in its predetermined adjusted position. If now for any reason, it is desired to lower the cone-shaped member 72, the manual control 114 is operated to connect the feed pipe line 115 with the return line 117 so that the liquid in the pistons 90 will be forced out of said pistons and will be returned to the pump 95 and reservoir 98.

Secured to the lower end of the reduced shaft 41 is a collar 120 which is provided with radially extending arms 121 having depending scraper blades 122 which are shaped such as to scrape the walls of the outer annular chamber of the member 32 formed by the marginal rim thereof and the annular upstanding wall 33a. A discharge outlet in the floor of the member 32 (not shown) is controlled by a sliding gate 123 having a control handle 124. Thus, the press cake will be removed with ease and facility while the juices, oils and other liquids will be collected through the various ducts and conduits previously described.

An annular deflector 125 is also supported on the radial arms 121, and is positioned beneath the lower open end of the inwardly directed annular drain wall 78 so that liquids further expressed from the pulp as it passes through the discharge choke will be directed through the screened openings 75 and will be directed toward the center of the member 32 for collection on the interior side of the upstanding wall 33a, and will finally find its way to the discharge conduit 35.

The discharge conduit 35 is provided with a central outlet pipe 126 having a flange 127 which can be bolted to the flange of a pipe line collection manifold (not shown).

In operation, a motor or the like is drivingly connected to the pulleys 59 to impart rotation to the rotary hollow shaft 40 at a reduced speed. The cone-shaped member 72 is next adjusted to produce the desired restricted discharge choke opening by manipulating the valves in the manner previously described. After the cone-shaped member 72 has been adjusted to the desired predetermined position, material to be expressed is fed to the hopper 24. As the hollow shaft rotates, the material is fed downwardly and the liquid contents are extruded through the openings in the inner and outer shells 40 and 22 and is collected in the members 18 and 32 respectively. The pulp then passes toward the discharge choke or restricted opening of the press and is further expressed during its travel through the gradually decreasing space between the cooperating conical wall surfaces 25 and 74, and the liquid is collected in the trough in the annular member 18 and also in the central portion of the receptacle-shaped member 32. The filter cake then passes into the outer annular collection chamber in the member 32 on the outside of the upstanding annular wall 33 where it is collected and finally discharged through the outlet (not shown) controlled by the gate 123 and by the scraper blades 122.

The liquid or juices collected in the hollow shaft pass downwardly through the reduced shaft portion 41 and into the central portion of the conduit 35 where it mingles with the liquid from the trough in the member 18 and is piped to a suitable reservoir through the pipe section 126.

During the downward feeding movement of the pulp material in the extrusion chamber, the resistors 64 retard the material and in addition serve to clear the outer surface of the rotary hollow tapered shaft 40.

Liquid, such as oils and juices pass through the screen 76 and are directed inwardly by the conical deflector 78, and to prevent the juices and oils from finding their way to the bearing 42, a short downwardly inclined flange 128 is formed on the lower end of the collar so that the juices and oils or other liquids will be directed into the central collection chamber within the limits of the upstanding wall 33a and thereby will not cause damage to the bearing parts and shaft 42.

In order to prevent juices and oils extruded through the outer cylinder press cage 22 from dripping toward the screened openings 20 in the upwardly inclined casting wall 19, a radially extending flange 130 is formed at the upper end of the upwardly inclined wall 19 to overhang said screened openings 20 and thereby direct juices, oils and other liquids into the trough formed by the upwardly inclined wall 19 and outer wall of the annular member 18.

It is to be understood, that the form of the invention herewith shown and described is to be taken as a preferred embodiment and that various changes in the shape, size and arrangement of parts may be resorted to without departing from the spirit of the invention or the scope of the subjoined claims.

I claim:

1. In a continuous extrusion press, inner and outer press members defining an extrusion chamber therebetween having a discharge end, an annular member mounted at the lower end of said press members having an inwardly and upwardly directed wall, a ring slidably mounted on said annular member, a choke member supported by said ring and movable toward and away from the discharge end of said press, a series of pressure-actuated cylinders secured to said annular member in circumferentially spaced-apart relation, and piston rods connecting the pistons of said pressure-actuated cylinders with the movable ring, the extension of said piston rods moving the choke member toward the discharge end of said press.

2. In a continuous extrusion press, inner and outer press members, at least the outer thereof being perforated, defining an annular extrusion chamber having a discharge end, an annular member mounted adjacent the lower end of the outer and inner press members having an upwardly and inwardly inclined wall surface, a ring movably mounted on said annular member, a choke member supported by said ring and arranged adjacent the discharge end of said inner and outer press members, said choke member being provided with a downwardly and outwardly inclined wall adapted to cooperate with the upwardly and inwardly inclined wall of the annular member to form a restricted discharge orifice, and pressure-actuated cylinders between the annular member and ring arranged in circumferentially spaced-apart relation for moving said choke member toward said discharge end of said press.

3. In a continuous extrusion press, inner and outer press members, at least the outer thereof being perforated, defining an annular extrusion chamber having a discharge end, an annular member mounted adjacent the lower end of the outer and inner press members having an upwardly and inwardly inclined wall surface, a ring movably mounted on said annular member, a choke member supported by said ring and arranged adjacent the discharge end of said inner and outer press members, said choke member being provided with a downwardly and outwardly inclined wall adapted to cooperate with the upwardly and inwardly inclined wall of the annular member to form a restricted discharge orifice, pressure-actuated cylinders between the annular member and ring arranged in circumferentially spaced-apart relation for moving said choke member toward said discharge end of said press, and an annular collection chamber formed in the annular member to receive expressed liquid.

4. In a continuous extrusion press, a cylindrical press cage, a rotary hollow shaft mounted for rotation within said cage, said shaft being tapered to define an extrusion chamber of gradually decreasing area toward the discharge end of the press, screw flights on said shaft for feeding material toward the discharge end of said press, an annular member adjacent the lower end of the press having an upwardly and inwardly inclined wall, a ring slidably mounted on said annular member, arms depending from said ring, a choke member supported on the lower ends of said arms, said choke member being provided with a downwardly and outwardly inclined wall adapted to cooperate with the inwardly and upwardly inclined wall of the annular member to form a restricted discharge passage, pressure-actuated cylinders between the ring and annular member to move said ring upwardly, said cylinders being arranged in circumferentially spaced-apart relation, means for supplying said cylinders with pressure fluid, means for controlling said last-named means, means for rotating said hollow tapered shaft to feed material toward said discharge end, and means for collecting the extruded liquids exteriorly of said cage and the upwardly inclined, annular member wall.

5. In a continuous extrusion press, a cylindrical press cage, a rotary hollow shaft mounted for rotation within said cage, said shaft being tapered to define an extrusion chamber of gradually decreasing area toward the discharge end of the press, screw flights on said shaft for feeding material toward the discharge end of said press, an annular member adjacent the lower end of the press having an upwardly and inwardly inclined wall, a ring slidably mounted on said annular member, arms depending from said ring, a choke member supported on the lower ends of said arms, said choke member being provided with a downwardly and outwardly inclined wall adapted to cooperate with the inwardly and upwardly inclined wall of the annular member to form a restricted discharge passage, pressure-actuated cylinders between the ring and annular member to move said ring upwardly, said cylinders being arranged in circumferentially spaced-apart relation, means for supplying said cylinders with pressure fluid, means for controlling said last-named means, means for rotating said hollow tapered shaft to feed material toward said discharge end, a circular collection trough formed in said annular member for collecting the extruded liquids exteriorly of said cage and the upwardly inclined wall of the annular member, and means for collecting liquids extruded interiorly through said choke member.

6. In a continuous extrusion press, a cylindrical press cage, a rotary hollow shaft mounted for rotation within said cage, said shaft being tapered to define an extrusion chamber of gradually decreasing area toward the discharge end of the press, screw flights on said shaft for feeding material toward the discharge end of said press, an annular member adjacent the lower end of the press having an upwardly and inwardly inclined wall provided with a series of screened openings, a ring slidably mounted on said annular member, arms depending from said ring, a choke member supported on the lower ends of said arms, said choke member being provided with a downwardly and outwardly inclined wall adapted to cooperate with the inwardly and upwardly inclined wall of the annular member to form a restricted discharge passage, pressure cylinders between the ring and annular member to move said ring upwardly, said cylinders being arranged in circumferentially spaced-apart relation, means for supplying said cylinders with pressure fluid, means for controlling said last-named means, means for rotating said hollow tapered shaft to feed material toward said discharge end, means for collecting the extruded liquids exteriorly of said cage and the upwardly inclined wall of the annular member, and means for collecting liquids extruded interiorly through said choke member, said inclined choke member and annular member wall surfaces being of relatively different angularity to form a second extruded stage.

7. In a continuous extrusion press, inner and outer perforated press members defining an annular extrusion chamber having a discharge end, an annular member mounted adjacent the lower end of the outer and inner press members having an upwardly and inwardly inclined wall surface provided with screened openings, a ring movably mounted on said annular member, a choke member supported by said ring and arranged adjacent the discharge end of said inner and outer press members, said choke member being provided with a downwardly and outwardly inclined wall adapted to cooperate with the upwardly and inwardly inclined wall of the annular member to form a discharge orifice, and pressure-actuated cylinders between the annular member and ring arranged in circumferentially spaced-apart relation for moving said choke member toward said discharge end of said press.

8. In a continuous extrusion press, inner and outer perforated press members defining an annular extrusion chamber having a discharge end, an annular member mounted adjacent the lower end of the outer and inner press members having an upwardly and inwardly inclined wall surface provided with screened openings, a ring movably mounted on said member, a choke member supported by said ring and arranged adjacent the discharge end of said inner and outer press members, said choke member being provided with a downwardly and outwardly inclined wall adapted to cooperate with the upwardly and inwardly inclined wall of the annular member to form a restricted discharge orifice, pressure actuated cylinders between the annular member and ring arranged in circumferentially spaced-apart relation for moving said choke member toward said discharge end of said press, and an annular collection chamber formed in the annular member to receive expressed liquid expressed through the screened openings of said inclined wall.

9. In a continuous extrusion press, a cylindrical press cage, a rotary hollow shaft mounted for rotation within said cage, said shaft being tapered and perforated to define an extrusion chamber of gradually decreasing area toward the discharge end of the press, screw flights on said shaft for feeding material toward the discharge end of said press, an annular member adjacent the lower end of the press having an upwardly and inwardly inclined wall provided with a series of screened openings, a ring slidably mounted on said annular member, arms depending from said ring, a choke member supported on the lower ends of said arms, said choke member being provided with a downwardly and outwardly inclined wall adapted to cooperate with the inwardly and upwardly inclined wall of the annular member to form a restricted discharge passage, hydraulic cylinders between the ring and annular member to move said ring upwardly, said cylinders being arranged in circumferentially spaced-apart relation, means for supplying said cylinders with pressure fluid, means for controlling said last-named means, means for rotating said hollow tapered shaft to feed material toward said discharge end, means for collecting the extruded liquids exteriorly of said cage and the upwardly inclined, annular member wall, and means for collecting liquids extruded interiorly through said hollow shaft and choke member.

10. In a continuous extrusion press, inner and outer press members defining an extrusion chamber therebetween having a discharge end, an annular member mounted at the lower end of said press members having an inwardly and upwardly directed wall, a ring slidably mounted on said annular member, a choke member supported by said ring and movable toward and away from the discharge end of said press, a series of pressure-actuated cylinders secured to said annular member in circumferentially spaced-apart relation, and piston rods connecting the pistons of said pressure-actuated cylinders with the movable ring, movement of said piston rods with respect to said cylinders being effective to move the choke member toward and away from the discharge end of said press.

11. In a continuous extrusion press, inner and outer press members defining an extrusion chamber therebetween having a discharge end, an annular member mounted at the lower end of said press members having an inwardly and upwardly directed wall, a ring slidably mounted on said annular member, a choke member supported by said ring and movable toward and away from the discharge end of said press, pressure actuated means secured to said annular member and extendable means operated by said pressure actuated means connected with said movable ring, movement of said extendable means with respect to said pressure actuated means being effective to move said choke member toward and away from the discharge end of said press.

CLARENCE E. AHLBORN.

References Cited in the file of this patent

UNITED STATES PATENTS

| Number | Name | Date |
|---|---|---|
| 652,665 | Burr | June 26, 1900 |
| 1,233,930 | Strickland | July 17, 1917 |
| 1,245,950 | Neufeldt | Nov. 6, 1917 |
| 1,354,528 | Wertenbruch | Oct. 5, 1920 |
| 1,467,737 | Schueler | Sept. 11, 1923 |
| 1,630,157 | Ahlgren | May 24, 1927 |
| 1,838,996 | Lang | Dec. 29, 1931 |
| 1,851,191 | Lang | Mar. 29, 1932 |
| 1,960,399 | Taylor | May 29, 1934 |
| 2,340,009 | Meakin | Jan. 25, 1944 |
| 2,422,895 | Habenicht | June 24, 1947 |

FOREIGN PATENTS

| Number | Country | Date |
|---|---|---|
| 560,184 | Germany | Sept. 29, 1932 |
| 7,076 | Austria | Mar. 26, 1902 |
| 377,014 | Germany | June 8, 1923 |
| 427,571 | Great Britain | Apr. 26, 1935 |